United States Patent
Folberth et al.

(10) Patent No.: US 12,297,734 B2
(45) Date of Patent: May 13, 2025

(54) DOWNHOLE BAR ANTENNA WITH DISTRIBUTED WINDINGS

(71) Applicant: Baker Hughes Oilfield Operations LLC, Houston, TX (US)

(72) Inventors: Martin Folberth, Celle (DE); Jens Behnsen, Celle (DE); Andreas Hartmann, Celle (DE); Sven-Hendrik Lampe, Celle (DE); Nikolay Nikolaevich Velker, Novosibirsk (RU); David Sergeevich Vlasov, Novosibirsk (RU); Alexander S. Vershinin, Novosibirsk (RU)

(73) Assignee: Baker Hughes Oilfield Operations LLC, Houston, TX (US)

( * ) Notice: Subject to any disclaimer, the term of this patent is extended or adjusted under 35 U.S.C. 154(b) by 167 days.

(21) Appl. No.: 17/789,461

(22) PCT Filed: Dec. 30, 2019

(86) PCT No.: PCT/RU2019/001049
§ 371 (c)(1),
(2) Date: Jun. 27, 2022

(87) PCT Pub. No.: WO2021/137715
PCT Pub. Date: Jul. 8, 2021

(65) Prior Publication Data
US 2023/0043389 A1    Feb. 9, 2023

(51) Int. Cl.
*E21B 47/017* (2012.01)
*G01V 3/28* (2006.01)
(52) U.S. Cl.
CPC .............. *E21B 47/017* (2020.05); *G01V 3/28* (2013.01)

(58) Field of Classification Search
CPC .......... E21B 47/017; E21B 47/01; G01V 3/28
USPC ...................................................... 73/152.01
See application file for complete search history.

(56) References Cited

U.S. PATENT DOCUMENTS

| 5,442,294 | A  * | 8/1995  | Rorden ................... G01V 3/28 |
|           |      |         | 324/369                              |
| 11,053,793 | B2 * | 7/2021  | Hensarling ............. E21B 47/13 |
| 2008/0265894 | A1 | 10/2008 | Snyder                               |
| 2009/0160445 | A1 | 6/2009  | Hall                                 |
| 2009/0188663 | A1 | 7/2009  | Hall                                 |
| 2009/0315320 | A1* | 12/2009 | Finn ......................... H01Q 1/38 |
|           |      |         | 156/196                              |
| 2014/0368200 | A1* | 12/2014 | Wang ...................... E21B 47/12 |
|           |      |         | 324/338                              |

(Continued)

FOREIGN PATENT DOCUMENTS

EP            3340483        6/2018

OTHER PUBLICATIONS

International Search Report and Written Opinion mailed Sep. 3, 2020 in corresponding PCT Application No. PCT/RU2019/001049.

*Primary Examiner* — Marrit Eyassu
(74) *Attorney, Agent, or Firm* — Hogan Lovells US LLP

(57) ABSTRACT

A downhole antenna tool is disclosed for downhole well-logging or other downhole operations. Antenna bars are provided for winding of coils through associated coil carriers of individual ones of the antenna bars. The antenna bars with the wound coils are coated with a protection layer and are releasably coupled to a substrate of the downhole antenna tool using, for example, a silicone cushion layer.

15 Claims, 6 Drawing Sheets

(56) References Cited

U.S. PATENT DOCUMENTS

2016/0072184 A1\* 3/2016 Gao ................. H01Q 7/00
343/719

\* cited by examiner

DOWNHOLE BAR ANTENNA WITH DISTRIBUTED WINDINGS

CROSS REFERENCE TO RELATED APPLICATIONS

This application is a 35 U.S.C. 371 National Stage of International Application No. PCT/RU2019/001049, titled "DOWNHOLE BAR ANTENNA WITH DISTRIBUTED WINDINGS", filed Dec. 30, 2019, which is incorporated by reference herein in its entirety.

BACKGROUND

1. Field of Invention

The present disclosure is generally related to downhole bar antennas and, specifically, to downhole antenna tools and methods of making the tools with distributed windings to support propagation resistivity for Z-antennae used in well logging systems.

2. Description of the Prior Art

In hydrocarbon exploration and production processes, wellbores or boreholes are created for supporting production of hydrocarbons, including for oil and gas generation. Such wellbores or boreholes may be drilled with a drill string that may include tubing and jointed tubulars or continuous coiled tubing. The tubing may generally include a drilling assembly or a bottom hole assembly (BHA). The tubing may be attached to an end advancing a drill string into the wellbores or boreholes. The BHA may include one or more sensors and other tools, including directional tools to assist a drilling process. Further, the drill string may include a drill bit that is operated by a motor in the BHA, for instance. A propagation resistivity Z-antenna may be one such sensor or directional tool that is provided in the drill string. The propagation resistivity Z-antenna may be an antenna representing a magnetic dipole oriented along the tool or a z-axis associated with the tool. The Z-antennae may include a number of ferromagnetic bars oriented along a tool axis with a common winding that may encompass all the ferromagnetic bars, as well as significant parts of a tool steel body incorporating the ferromagnetic bars. Such a structure is subject to complicated repair and maintenance efforts as the structure has to be durable for downhole conditions. For example, the antenna must be removed, uncoiled, recoiled, and calibrated as part of any repair and maintenance effort.

SUMMARY

A downhole antenna tool is disclosed. The tool includes antenna bars with coils wound on individual ones of the antenna bars through associated coil carriers of the individual ones of the plurality of antenna bars. A protective coating is provided over the coils. The tool includes a substrate to which the antenna bars are releasably coupled. The substrate may include respective recesses in which the individual ones of the antenna bars are positioned and may include a cushion layer between the antenna bars and the substrate for mechanical decoupling of the antenna bars from the substrate.

A method of assembly or manufacture of a downhole antenna tool is also disclosed. The method includes winding one or more coils on individual antenna bars through associated coil carriers of the individual antenna bars. A protective coating is applied to the one or more coils in the method. The method also includes positioning the individual antenna bars in respective recesses of a substrate of the downhole antenna tool so that the antenna bars are releasably coupled to the substrate. The method may further include providing a mechanical decoupling using, for example, a cushion layer between the individual antenna bars and the substrate.

BRIEF DESCRIPTION OF THE DRAWINGS

Some of the features and benefits of the present invention having been stated, others will become apparent as the description proceeds when taken in conjunction with the accompanying drawings, in which.

Figure 1:
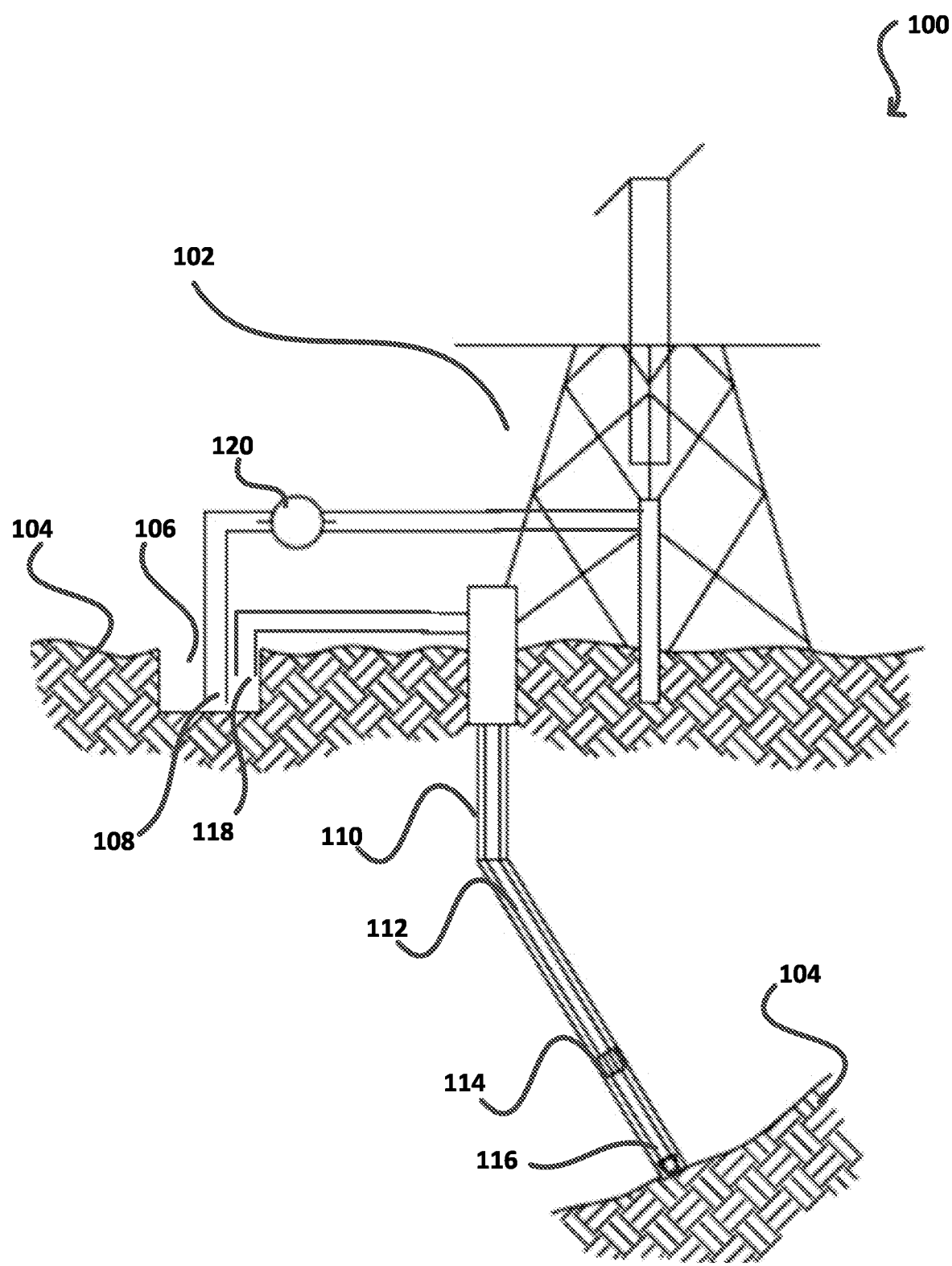
FIG. 1 illustrates an example system of a drill string with a downhole antenna tool including one or more downhole bars with distributed windings, according to an aspect of the present disclosure.

While the invention will be described in connection with the preferred embodiments, it will be understood that it is not intended to limit the invention to that embodiment. Instead, the preferred embodiments are intended to cover all alternatives, modifications, and equivalents, as may be included within the spirit and scope of the invention as defined by the appended claims

DETAILED DESCRIPTION OF THE DISCLOSURE

So that the manner in which the features and advantages of the embodiments of downhole antennas with distributed windings, as well as methods to manufacture, operate, and others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

A downhole antenna tool with one or more antenna bars having distributed windings and methods to manufacture and operate the downhole antenna tool is described hereinafter with reference to the accompanying drawings in which aspects are shown. The downhole antenna tool and associated manufacture or operation may be available in many different forms and should not be construed as limited to the illustrated aspect set forth herein; rather, these aspects are provided so that this disclosure will be thorough and complete, and will fully convey its scope to those skilled in the art. Like numbers refer to like elements throughout. In an embodiment, usage of the term "about" or "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The present disclosure is to a downhole antenna tool that resolves the above-stated concern using distributed windings on one or more antenna bars with a predetermined core shape, such as one of a trapezoidal shape or a rectangular shape, and by releasably coupling the one or more antenna bars to a substrate of the downhole antenna tool. The one or more antenna bars may also be mechanically decoupled from the substrate by a cushion layer between the antenna bars and the substrate, for instance. Mechanical decoupling refers to reduced transmission of mechanical forces, such as movement and impact, from the substrate to the antenna bars. Releasable coupling refers to any attachment between the antenna bars and the substrate being releasable so that the antenna bars may be removed from the substrate and replaced or maintained as required. In this manner, an efficient system for a downhole antenna tool is disclosed that may be easily removed from the substrate as it is already mechanical decoupled in the manufacturing stage. Additionally easy removal and replacement is encouraged by the structure of the present tool as the antenna bars are easily accessible on the substrate.

FIG. 1 illustrates an example system 100 of a drill string 112 with a downhole antenna tool 114 comprising one or more downhole bars with distributed windings according to an aspect of the present disclosure. The drill string 112 may be comprised in a tubular piping 110 within a borehole. The drill string 112 may be motorized to rotate a drill head 116 through soil layers 104. An external support structure 102 is provided external to the drilling operations, with a pit 106 that may include a drill fluid, e.g., mud, that may be pressurized through the drill string 112 via line 108 using motor 120, and that may be egressed out of line 118. The drill head 116 includes a drill bit and opening to discharge the drill fluid, which helps with the drilling process. The drill fluid returns via the borehole back to the pit 106.

Figure 2:
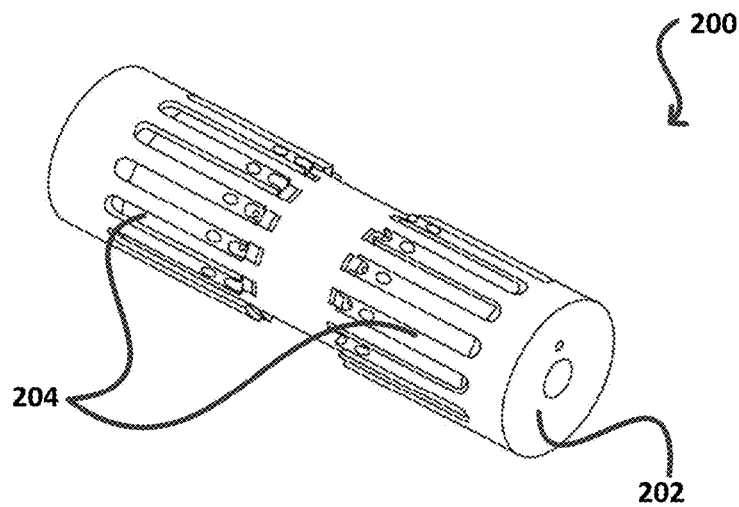
FIG. 2 illustrates details of a version of a downhole antenna tool with tiles used as part of a Z-antenna that is improved by aspects of the present disclosure.
Figure 3:
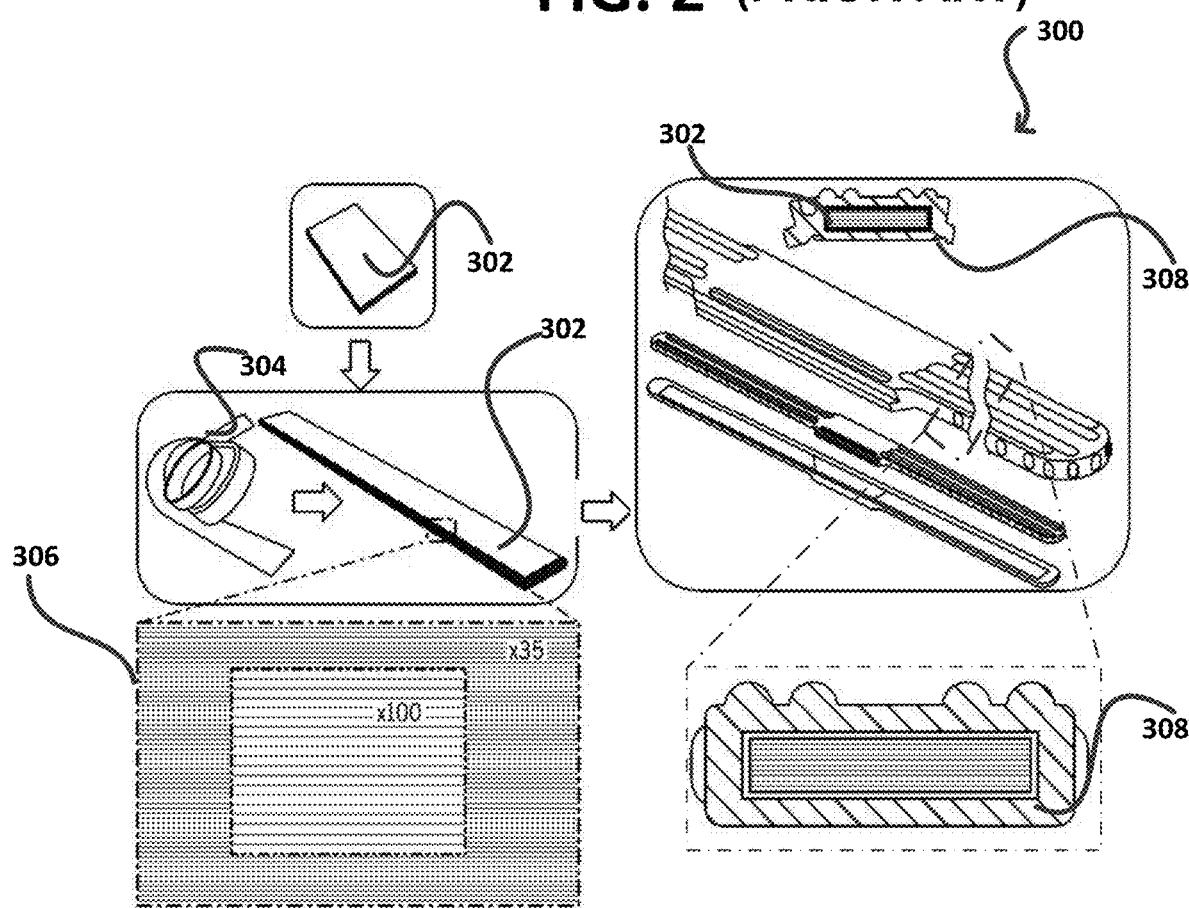
FIG. 3 illustrates details of a process flow to manufacture the tiles of the downhole antenna tool from FIG. 2.

FIG. 2 illustrates details of a version of a downhole antenna tool 200 with tiles 204 used as part of a Z-antenna that is improved by aspects of the present disclosure. The tiles 204 may be ferrite tiles glued to the substrate 202 of the downhole antenna tool 200. FIG. 3 illustrates details of a process to manufacture the tiles 204 of the downhole antenna tool from FIG. 2. For example, tiles 302 may be formed from ferrite tape strips 304 that are laminated together, and are then encapsulated in an elastomer 308. The tape may include nanocrystalline material. The nanocrystalline material may be packaged in an elastomer. In a further example, the ferrite core may be composed of manganese-zinc ferrite (MnZn) with a ceramic core. The resulting structure is brittle and may not function well for longer bar lengths. Such a core, however, requires core segmentation and is inert to mud in downhole conditions. Reference numeral 306 illustrates different magnifications of the tiles.

FIG. 3 also illustrates various cut-section and full-section views of a tile 302 packaged in an elastomer 308. An alternate to the ferrite tile may be constructed from nanocrystalline FeCuNbSiB-Iron alloy. The FeCuNbSiB material is apparent to a person of ordinary skill in the art as to composition and associated processing for such implementations. A tile constructed from FeCuNbSiB and including iron forms a nanocrystalline tape core. As illustrated in reference number 304, laminated tape strips are used to form the nanocrystalline tile, and may be available in lengths greater than 600 mm. While such a construction may be more robust than a ferrite bar, it requires protection from mud in the downhole environment.

The above-referenced core 302 may be alternatively manufactured by laminating ribbons or tape that is 20 micrometers (μm) in length. The laminated ribbons or tape compose about 80%-90% of the cross-section. An interlayer insulation of oxide and epoxy bonding may be used in the lamination procedure. Further, the interlayer insulation may be 2-4 μm thickness. A packaging process in the manufacturing of the tiles may include a compression molding of the insulated laminated tiles. The molding may use compounds with low compound velocities and low pressure differentials within the mold.

Figure 4:
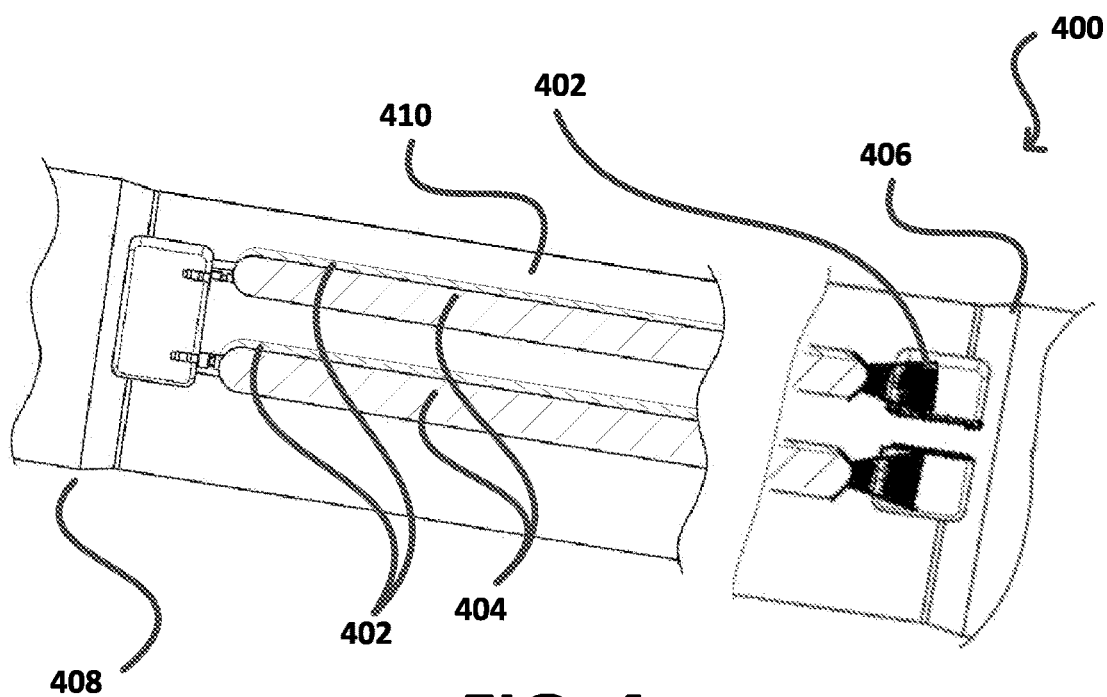
FIGS. 4 and 5 illustrate side and perspective cross-sectional views of a downhole antenna tool, in accordance with aspects of the present disclosure.
Figure 5:
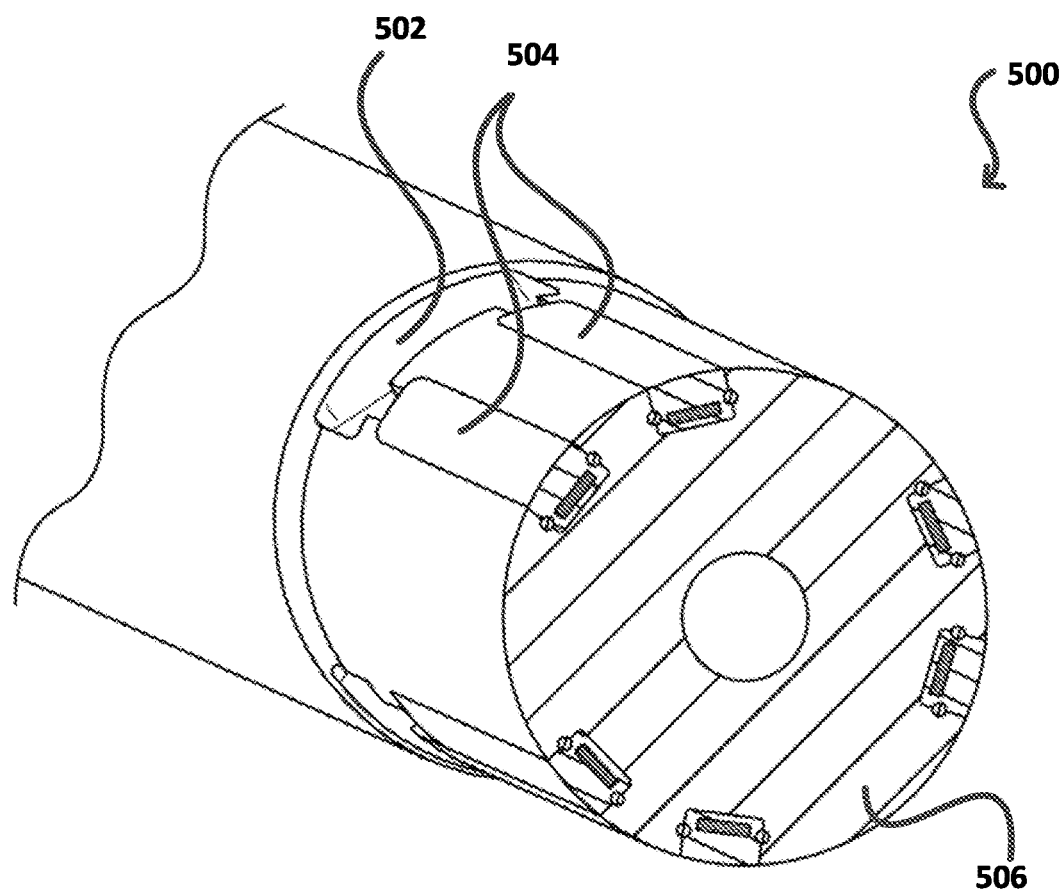

FIGS. 4 and 5 illustrate a side view 400 and a perspective cross-sectional view 500 of a downhole antenna tool, in accordance with aspects of the present disclosure. The views illustrate one or more antenna bars 404 in recessed areas 402 of the downhole antenna tool. Further, the one or more antenna bars 404 may be mechanically decoupled in the recessed areas. For example, a cushioning layer may be provided for mechanically decoupling the one or more antenna bars 404 from a substrate 410 providing the recessed areas 402. In an aspect, the cushioning layer may be a silicone tape, other relevant material, such as a hydrogenated nitrile rubber (HNBR)-inlay compound or other radial sealing compound offering radial pretension. The downhole antenna tool may be associated with the drill string 112 via fixtures 406, 408, which may be the ends of the antenna substrate 410. A first fixture 406 may be an end insert and a second fixture 408 may be a wire collector pocket. Further, a material that is used to form the downhole antenna tool may form part of the substrate 410 (and optionally, the fixtures 406, 408) to which the antenna bars 404 are fixed. In FIG. 5, a perspective cross-sectional view 500 of a downhole antenna tool is illustrated with the antenna bars 504 within recessed areas 502 of the downhole antenna tool. Face 506 of the downhole antenna tool illustrates a supporting passage for drill fluid and may include the above-referenced fixtures 406, 408, for instance.

Figure 6:
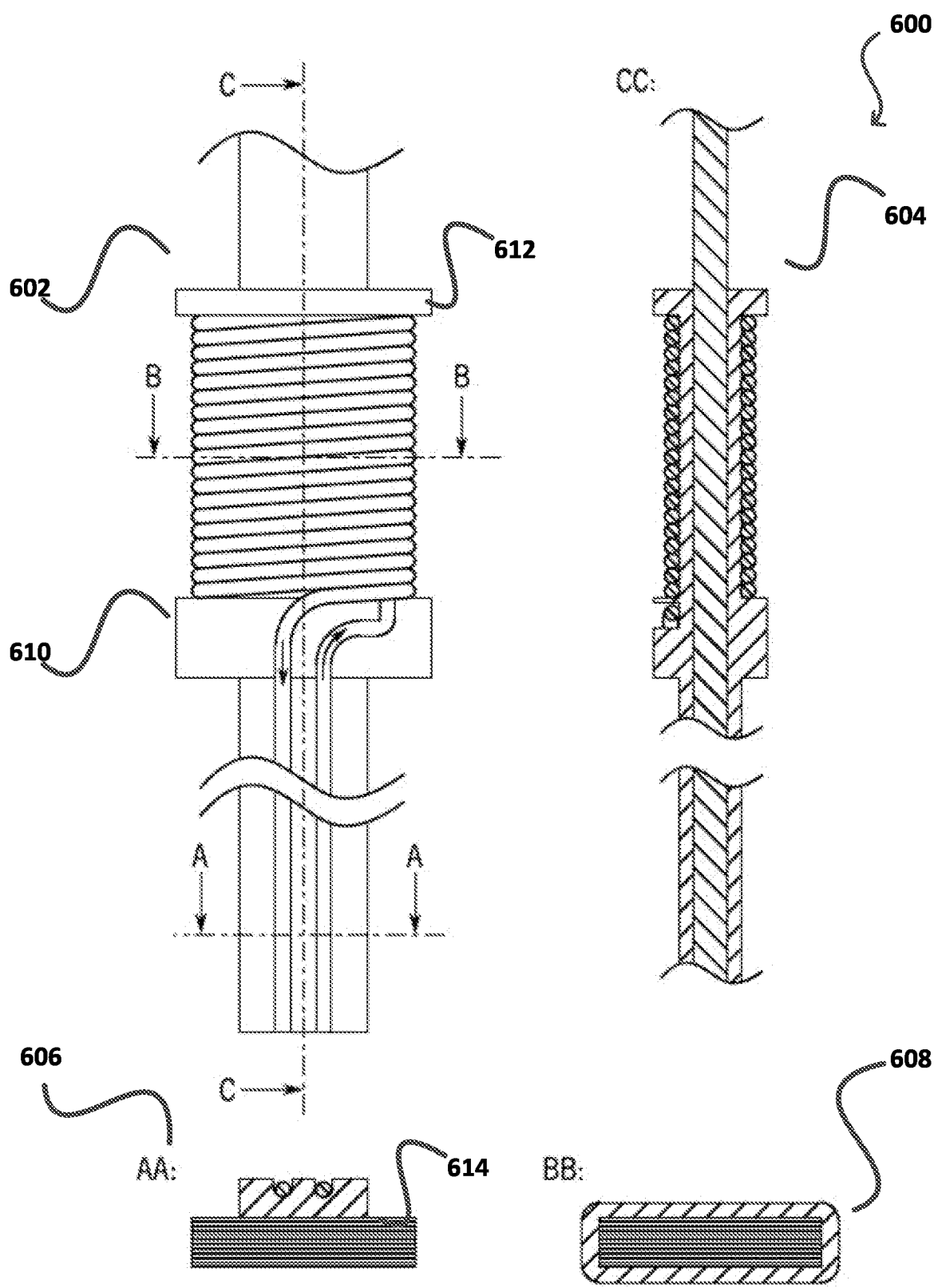
FIG. 6 illustrates winding details in different views of a downhole antenna bar with distributed windings for a downhole antenna tool, in accordance with aspects of the present disclosure.

FIG. 6 illustrates winding details in different views 602-608 of a downhole antenna bar 400 with distributed windings for a downhole antenna tool, in accordance with an aspect of the present disclosure. The general view 602 is supported by upper cross sectional view 408 across axis marked BB in general view 602; by side view 604 across axis marked CC in general view 602; and by lower cross sectional view 606 across axis marked AA in general view 602. The different views 602-608 illustrate coil carriers 610, 612 in a first fixture and in a second fixture (such as fixtures 406, 408 in FIG. 4), above and below the coil area to geode the coil in a parallel arrangement (i.e., not twisting the coil). The wire is guided within the coil carrier 610 to the core 614 and wound around the core 614 in the manner illustrated. Further, as illustrated in view 606, wire guiding on the bottom side of the core 614 offers additional shielding effects from the downhole environment and operative interference of signals. The core 614 may be dimensioned at 1.00±0.2 mm in its width, making it wider relative to its thickness, as illustrated in the profile or views AA 606 and CC 604.

In the present disclosure, one or more antenna bars with winding, such as antenna bar 600, are prepackaged and are provided with pressure-proof connectors that connect each bar of the one or more antenna bars to an antenna wiring harness. Thereafter, replacement of each bar does not require a complete antenna rebuild, but may be achieved by, for example, replacement of a defective antenna bar at issue during a repair and maintenance operation. The antenna bars may be ferromagnetic bars with windings thereon. While the turns of wire forming the windings on the antenna bar are illustrated as contacting each other, the turns need not touch each other in aspects of the disclosure, but can be spaced apart. Further, in other aspects, the windings can be spread over the entire bar. Still further, the number of turns, the width, end-to-end distance, and height of the antenna bar may be adjusted to suit to the application requirements. In an aspect, individual ones of the antenna bars may be situated at a predetermined height from a center of the downhole antenna tool, within respective recesses. The predetermined height allows the individual ones of the antenna bars to be adjacent to an outer surface of the substrate and within the respective recesses depending on the application requirements.

The windings and the antenna bars are encapsulated in a suitable coating that may be a downhole-conditions-proof insulating material such as polyether ether ketone (PEEK) or rubber. Each coated antenna bars may be recessed in suitable grooves or recessed areas as illustrated in FIG. 4, around the downhole antenna tool circumference. A substrate may be a separate component of the downhole antenna tool, but may be part of a singular material used to make a substantial (e.g., 50%) portion of the downhole antenna tool. For example, the substrate may be manufactured integral to the tool. These aspects make the antenna bars extremely durable. The present disclosure also enables a downhole antenna tool that has superior technical advantages other than the durability, as a result of the above-referenced structures. For example, an advantage achieved in the present aspects include reduced common-mode coupling, lower repair and maintenance (R&M) costs, faster R&M turnaround time, and faster antenna build times. In an aspect, the antenna bars may be suspended in the protective coating within the respective recesses.

Figure 7:
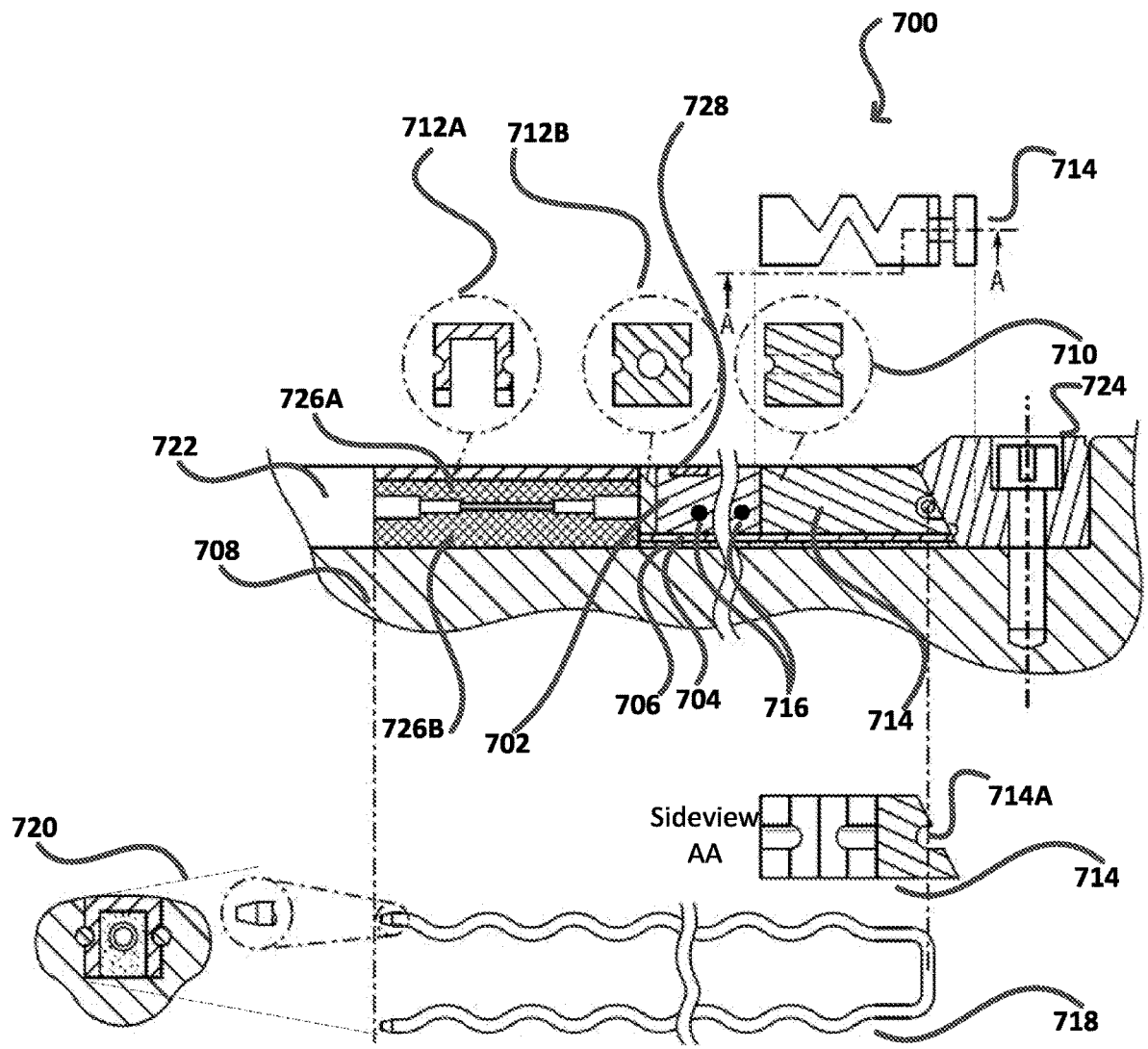
FIG. 7 illustrates mechanical decoupling of the downhole antenna bar from a substrate of the downhole antenna tool, according to aspects of the present disclosure.

FIG. 7 illustrates mechanical decoupling of the downhole antenna bar 702 from a substrate 708 of the downhole antenna tool 700, according to aspects of the present disclosure. In FIG. 7 antenna bar 702 is illustrated with an applied protective coating, but is referred to herein generally as the antenna bar to illustrate its relative location to components providing the mechanical decoupling to the substrate 708. The mechanical decoupling is at least enabled via one or more of a flex spring 714, washer 712B, and a connector cover 712A, as well as with silicone (e.g., silicone tape) and/or HNBR-inlay 704 forming a cushioning layer with for radial protection. A copper shield 706 may be used between antenna winding on antenna bar 702 and the substrate body 708 to further reduce eddy current losses, particularly at higher frequencies. The downhole antenna bar 702 may be situated between a manifold 722 and an end-block portion 724 of the substrate (integrally part of or that is separately attached to the substrate) of the downhole antenna tool 700. The connector cover 712A protects an upper and a lower bed piece 726A, 726B associated with the substrate 708. A fixation ring 728 and z-inserts 716 are provided to stabilize the coils of the antenna bars, e.g., bar 702. A pocket 714A is provided in the flex spring 714 for locking a rod bracket 718 from the end-block portion 724 through the components 712A, 712B, 710, and into manifold 722. The ends 720 of the rod bracket 718 are illustrated as having narrow tips to engage manifold 722.

A packaging process for the antenna bar of FIG. 7 may use HNBR elastomer that is molded with the antenna bar 702 in its respective recessed area of the substrate 708. Alternatively, a compound that has chemical robustness, low vulcanization temperatures, and ability to dampen mechanical vibration may be used for the packaging process. The packaging process or a manufacturing process for the present downhole antenna tool includes application of the molding over the antenna bar. The molding creates a specific geometry that may be predetermined for aerodynamic properties of the drill string and the tool. The present packaging may adapt a printed circuit board assembly (PCBA) to account for pretension and to compensate for swelling and thermal expansion. In an alternate implementation, a chemical vapor deposited polymer may be used as part of a coating or the molding process. The coating or molding process supports media separation, which eliminates core corrosion and chemical degradation.

Figure 8:
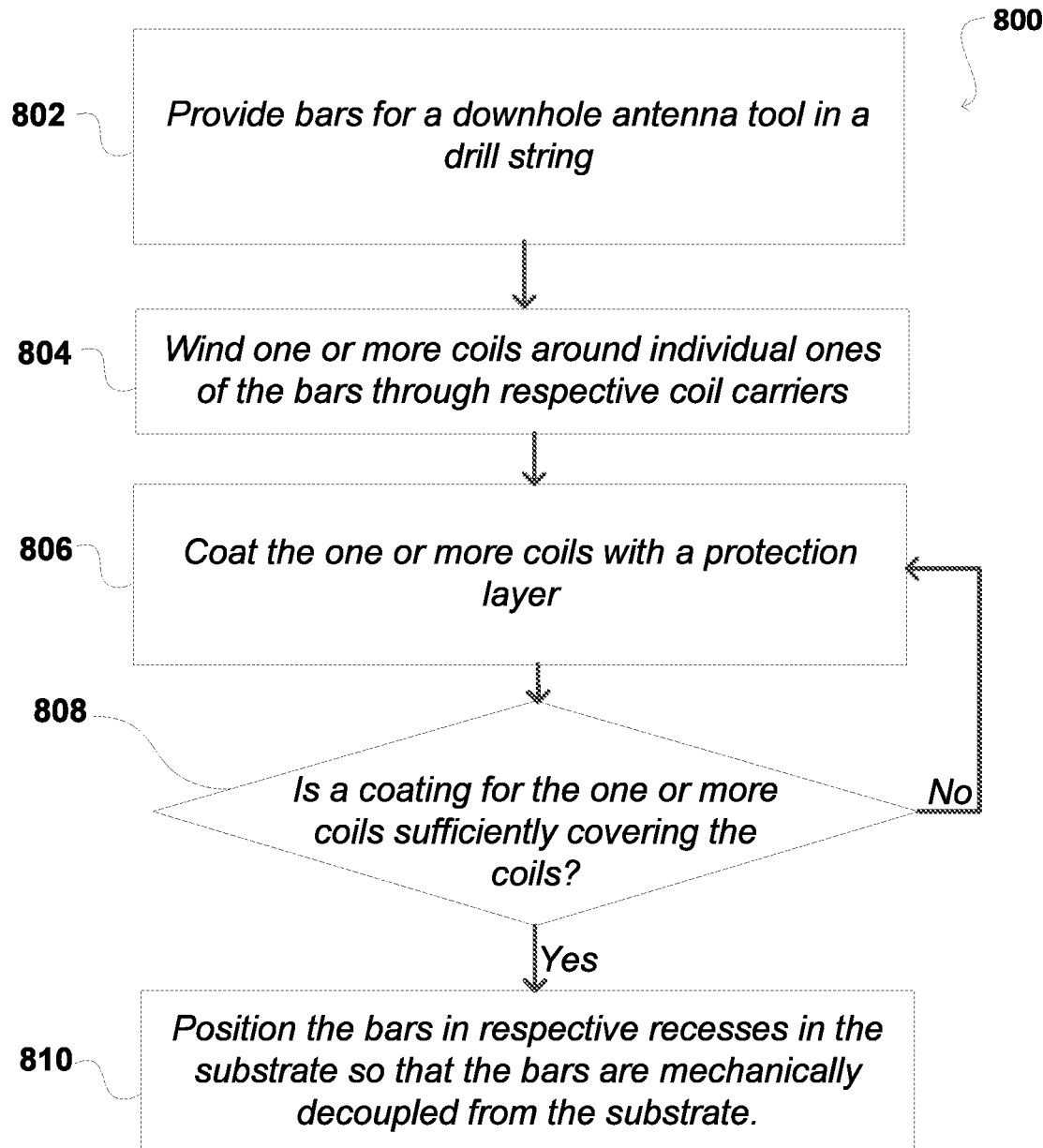
FIG. 8 is a flowchart illustrating an assembly or a manufacturing process for a downhole antenna tool having one or more antenna bars with distributed windings, in accordance with an aspect of the present disclosure.

FIG. 8 provides a flowchart 800 for manufacturing a downhole antenna tool having one or more antenna bars with distributed windings, in accordance with an aspect of the present disclosure. The method of manufacture includes using bars that are made of a nominal alloy composition of ferrous, copper, niobium, silicon, and boron. The bars are provided for the downhole antenna tool according to dimensions and positioning determined for the tool in sub-process 802. In an aspect, the dimensions and positioning may be determined based in part on an intended application of the downhole antenna tool. In sub-process 804, coils are wound on the bars, individually, through respective coil carriers that may be coupled to the individual bars. The bars, with the coils, are then subject to a coating for protection against downhole conditions in sub-process 806. The coating may be applied prior to placing the bars in respective recesses of a substrate or may be performed after placing the bars in the respective recesses. In sub-process 808, verification may be performed to determine that the coating for the one or more coils is sufficiently over the coils so that the coils are protected against downhole environment conditions apparent in downhole operations. When such verification generates a negative result, the coating may be repeated either over a prior coating or by stripping and recoating the bars with the wound coils. In sub-process 810, when the verification sub-process 808 generates a positive result, the one or more bars are positioned in the respective recesses of the substrate so that the one or more bars are mechanically decoupled from the substrate. The ability of the bars to be mechanically decoupled from the substrate can be achieved in any appropriate way. For example, the bars can be attached to the substrate using a cushion layer of silicone or other appropriate material that will then allow selective decoupling when necessary or desired. In addition, washers, connectors, and other components may be used to releasably couple the bars to the substrate while still providing the ability to mechanically decouple the bar from the substrate.

The present invention described herein, therefore, is well adapted to carry out the objects and attain the ends and advantages mentioned, as well as others inherent therein.

While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

The singular forms "a," "an," and "the" include plural referents, unless the context clearly dictates otherwise.

What is claimed is:

1. A downhole antenna tool characterized by:
   a substrate comprising at least one recessed area along a tool axis;
   an antenna bar that is placed in the recessed area;
   a core in the antenna bar;
   a coil wound around the core;
   an end-block to releasably couple the antenna bar to the substrate; and
   a spring between a first axial end of the antenna bar along the tool axis and the end-block.

2. The downhole antenna tool of claim 1, further characterized by a cushion layer of silicone or a hydrogenated nitrile rubber (HNBR)-inlay compound dispersed within the recessed area of the substrate.

3. The downhole antenna tool of claim 1, further characterized by:
   a protective coating over the antenna bar and the coil, wherein the coating is a single application over both the coil and the antenna bar.

4. The downhole antenna tool of claim 1, further characterized by:
   the antenna bar shaped in one of a trapezoidal shape or a rectangular shape.

5. The downhole antenna tool of claim 1, further characterized by:
   the antenna bar being part of a plurality of antenna bars in the substrate, the plurality of the antenna bars arranged symmetrically on the substrate.

6. The downhole antenna tool of claim 1, wherein the core includes a ferromagnetic cores.

7. The downhole antenna tool of claim 1, wherein the antenna bars is encapsulated in polyether ether ketone (PEEK) or rubber.

8. The downhole antenna tool of claim 1, further characterized by:
   a coil carrier in the antenna bar and a wire guide in the coil carrier and on a second axial end of the antenna bar, the second axial end being along the tool axis and opposite the first axial end.

9. A method of assembly of a downhole antenna tool comprising:
   winding a coil around a core of an antenna bar;
   placing the antenna bar in a recessed area that is along a tool axis and within a substrate;
   releasably coupling the antenna bar to the substrate using an end-block; and
   enabling a spring between a first axial end of the antenna bar and the end-block, the first axial end being along the tool axis.

10. The method of assembly of the downhole antenna tool of claim 9, further characterized by:
    dispersing a cushion layer within the recessed area, the cushion layer comprising one of silicone or an hydrogenated nitrile rubber (HNBR)-inlay compound.

11. The method of assembly of the downhole antenna tool of claim 9, further characterized by:
    enabling a coil carrier in the antenna bar and a wire guide in the coil carrier, the coil carrier on a second axial end of the antenna bar, the second axial end along the tool axis and opposite the first axial end.

12. The method of assembly of the downhole antenna tool of claim 9, further characterized by:
    shaping the antenna bar in one of a trapezoidal shape or a rectangular shape.

13. The method of assembly of the downhole antenna tool of claim 9, further characterized by:
    enabling the antenna bar to be part of a plurality of antenna bars in the substrate; and
    arranging the plurality of antenna bars on the substrate in a symmetrical arrangement.

14. The method of assembly of the downhole antenna tool of claim 9, further characterized by:
    providing the recessed area to extend along a length of the substrate; and
    suspending the antenna bar in a protective coating within the recessed area, wherein the protective coating is over the antenna bar and the coil and wherein the coating is a single application over both the coil and the antenna bar.

15. The method of assembly of the downhole antenna tool of claim 9,
    wherein the core includes a ferromagnetic core.

* * * * *